United States Patent [19]

Raborar et al.

[11] Patent Number: 5,032,175
[45] Date of Patent: Jul. 16, 1991

[54] PROCESS FOR REMOVING IMPURITIES FROM FLUE DUSTS

[75] Inventors: Simon C. Raborar; Marcial B. Campos; Alex H. Penaranda, all of Leyte, Philippines

[73] Assignee: Philippine Associated Smelting and Refining Corporation, Metro Manilla, Philippines

[21] Appl. No.: 480,077

[22] Filed: Feb. 14, 1990

[30] Foreign Application Priority Data

Feb. 15, 1989 [PH] Philippines ............................... 38198

[51] Int. Cl.$^5$ ............................................... C22B 3/46
[52] U.S. Cl. ........................................ 75/416; 75/638; 75/726; 75/961; 209/3; 209/173; 423/47; 423/27; 423/87; 423/98; 423/109
[58] Field of Search ................. 75/416, 634, 638, 726, 75/731, 961; 209/3, 173; 423/27, 47, 87, 98, 108

[56] References Cited

U.S. PATENT DOCUMENTS 4,162,915 7/1979 Maes et al. .......................... 75/634
4,488,950 12/1984 Pooley et al. ........................ 75/726

FOREIGN PATENT DOCUMENTS 162233 9/1984 Japan ..................................... 75/961

Primary Examiner—Melvyn J. Andrews
Attorney, Agent, or Firm—Sheridan, Ross & McIntosh

[57] ABSTRACT

The invention is a process for the removal of high concentrations of impurities including antimony (Sb), bismuth (Bi), arsenic (As), lead (Pb), zinc (Zn), cadmium (Cd), selenium (Se) and tellurium (Te) contained in flue dusts produced during the smelting of copper. To effect the separation, the flue dust is slurried to about 10-30 weight percent solids. Then slurry is fed to gravity separation equipment, where the lighter impurities fraction segregates from the heavier revenue metals fraction. The segregated high copper concentrate is then washed while the tailings are neutralized by lime milk, dewatered and recovered as tailings cake. The wash solution together with the thickener overflow is subjected to copper cementation to recover the dissolved copper in the solution. The lighter impurities fraction can be subjected to acid leaching in order to further recover copper therefrom.

14 Claims, 1 Drawing Sheet

PROCESS FOR REMOVING IMPURITIES FROM FLUE DUSTS

FIELD OF THE INVENTION

The present invention relates generally to a method for removing deleterious compounds from flue dust, and in particular to a method for reducing the amount of contaminants such as antimony (Sb), bismuth (Bi), arsenic (As), lead (Pb), zinc (Zn), cadmium (Cd), selenium (Se), tellurium (Te) and compounds thereof, in copper-containing flue dusts in order to obtain a copper-rich concentrate.

DESCRIPTION OF THE PRIOR ART

The pyrometallurgy of copper involves the step-by-step upgrading of the raw material copper concentrate, which is typically initially about 25 to 30 percent copper, to an end product of anode copper containing about 99.5 percent copper in a series of unit operations involving smelting, converting and refining. During flash smelting, converting and the like, a considerable volume of dust is generated which is carried off with exhaust gases. These flue dusts are typically recovered in downstream dust collection equipment and recycled, due to the high levels of primary revenue metals (i.e. copper, gold and silver) still contained in these dusts.

The process of metal upgrading is actually the elimination of impurities from the main component, in the present case copper. The impurity elements are eliminated in the form of the slag, gas and dusts. Therefore, recycle of copper-containing flue dusts already out of the system not only recaptures lost copper, but also reintroduces impurities and consequently deteriorates the quality of the final copper product.

Impurities may be volatilized during smelting and converting as metallic vapor, as volatile sulfides or as volatile oxides. Impurities such as Sb, Bi, As, Pb, Zn, Cd, Se and Te are typically oxidized during smelting, and more specifically so, during converting where excess air is blow into the molten metal. The oxidized impurities are commonly recovered with gas-entrained copper, gold and silver at exhaust waste heat boilers and cyclones. Additionally, extremely fine particles can be recovered in electrostatic precipitators. Presently, it is common practice to totally recycle the dust recovered from the aforementioned dust collecting equipment. However, because the recycle of "dirtier" recovered dusts has led to difficulties in meeting copper purity specifications, it is sometimes necessary to hold from the recycle stream the more impurity-laden flue dusts, such as electrostatic precipitator dusts, in order to arrest impurity build-up. Oftentimes, it is convenient to sell these impurities to other processors, for example, lead-zinc smelting facilities, since electrostatic precipitator dusts are usually high in lead.

While it is sometimes possible to dispose of the electrostatic precipitator dusts if lead smelters exist nearby, the problem which besets facilities without this advantage is the economics of transporting the dust to distant buyers and/or the cost of stockpiling.

In view of the increasing inventories of nonrecyclable dust which still contains a high concentration of revenue metals, it would be advantageous to have a method by which impurities could be removed from flue dusts, while maintaining an acceptable level of revenue metals in the resulting concentrate. It would also be advantageous if this could be accomplished in an economic manner in order to justify the treatment of stockpiled dust.

SUMMARY OF THE INVENTION

In accordance with the present invention, a process is provided for removing impurities from copper-containing flue dusts. This process permits the recycling of dust to a smelting and converting process stream without the disadvantage of reintroducing deleterious impurities into the system.

In accordance with one embodiment of the present invention, a process is provided for treating a copper-containing flue dust in order to remove a substantial portion of impurities from said flue dust. Initially the flue dust is mixed with water to form a slurry, preferably comprising from about 10 to about 30 weight percent flue dust solids. The slurry is then subjected to gravity separation wherein a portion of the copper remains in a heavy concentrate fraction and a substantial portion of the impurities comprising arsenic, bismuth, antimony, cadmium, lead, zinc, tellurium, selenium or compounds thereof, are removed from the flue dust and separated into a light tailing fraction.

Preferably, the gravity separation is accomplished by employing gravity separation equipment such as shaking tables, spiral concentrators and centrifugal bowl concentrators. A preferred example of a shaking table is a diagonal riffle finishing shaking table.

In accordance with another embodiment of the present invention, another process is provided for removing impurities from a copper-containing flue dust. Initially, water is added to flue dust in order to produce a slurry comprising from about 10 to about 30 weight percent flue dust solids. The slurry is subjected to gravity separation in order to obtain a heavy concentrate fraction containing at least 35 weight percent copper and a light tailing fraction containing the majority of impurity compounds, said impurity compounds comprising compounds containing elements selected from the group consisting of arsenic, bismuth, antimony, cadmium, lead, zinc, tellurium and selenium. Both the heavy concentrate fraction and the light tailing fraction are subjected to solid/liquid separation. The solids from the heavy concentrate fraction are recycled to a copper smelting and converting process. The liquid overflow from the solid/liquid separation performed on the heavy concentrate fraction and the liquid overflow from solid/liquid separation performed on the light tailing fraction are then subjected to copper cementation in order to further recover copper.

It has surprisingly been found that gravity separation equipment can be employed to remove impurities even though the specific gravities of some of the undesirable impurities may be similar to the specific gravities for the desirable copper and copper compounds.

Furthermore, some impurities exist in water soluble states whereas copper, silver and gold are typically metallics. The partial dissolution of the impurities coupled by the concentrating effect on the heavier metals fraction imparted by the gravity separation equipment makes possible the removal of impurity compounds containing Sb, Bi, As, Cd, Zn, Pb, Te, Se, etc.

DETAILED DESCRIPTION OF THE INVENTION

Figure 1:
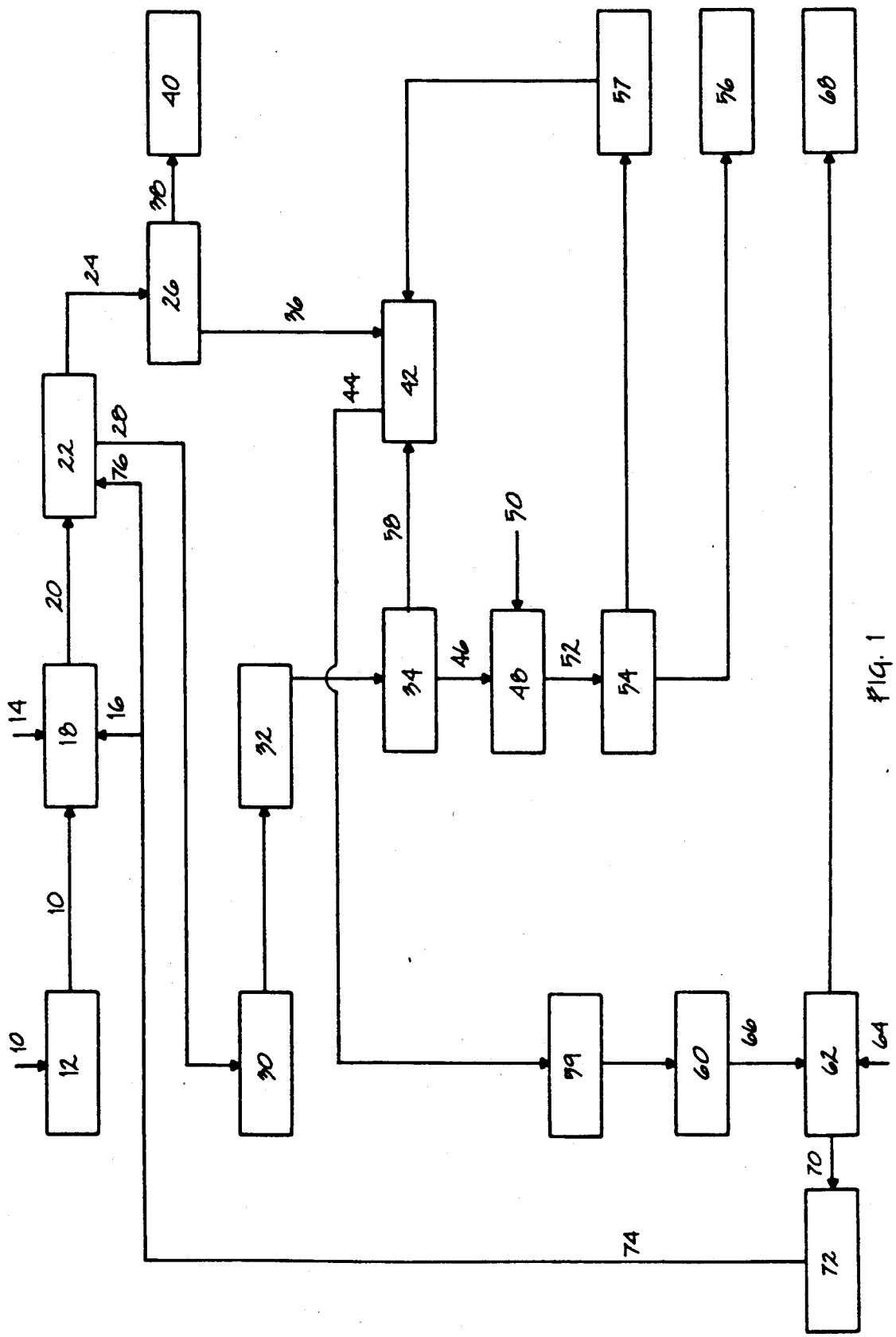
FIG. 1 is a flow diagram illustrating the preferred embodiment of the process of the present invention.

As illustrated in the flow diagram of FIG. 1, flue dust 10 is introduced into a feed hopper 12. The flue dust 10 is then slurried with make-up water 14 and/or recycled water 16 in a mixing vessel 18, preferably to a concentration of from about 10 to about 30 weight percent solids. This dust slurry 20 is then fed to gravity concentrating equipment 22, preferably a diagonal riffle finishing shaking table.

While not wishing to be bound by any theory, it is believed that both specific gravity and particle size play a role in the separation of contaminant particles from the revenue particles that make up the flue dust. Although differences in specific gravity are often exploited in order to separate materials, in the present case differences in specific gravity would not appear to be sufficient to explain the positive results obtained. This is because the specific gravities (shown in parentheses) for copper (about 8.9), copper oxides (from about 6 to about 6.45) and copper sulfides (about 5.5 to about 5.8) fall within the ranges of the specific gravities for the oxides of many of the impurity materials. For example, the specific gravities for the oxides of the following impurities are: antimony (about 5.2 to about 5.7), bismuth (about 8.2 to about 8.9), arsenic (about 3.7 to about 3.9), cadmium (about 6.9 to about 8.2), zinc (about 5.5 to about 5.6), lead (about 8.0 to about 9.5), selenium (about 4.2 to about 4.8) and tellurium (about 6.0 to about 6.3). These figures were obtained from the Chemical Engineer's Handbook (Fifth Edition), edited by R.H. Perry and Cecil H. Chilton, 1973, pages 3-6 through 3-44.

It is apparent that differences in specific gravity of the magnitude of the above-identified figures cannot account for the separation achieved with the practice of the present invention. While not wishing to be bound by any theory, it is believed that the actual specific gravities of the impurity particles may be less than the published values (possibly due to entrained gas) and/or particle size also plays a crucial role. Typically, the impurity oxide particles are particles recondensed from volatilized impurities, and are very small in size. Additionally, the recondensed particles may contain entrained gases, and therefore may have lower specific gravities than the published figures. On the other hand, the revenue metal particles typically comprise metallic copper containing small amounts of metallic gold and metallic silver, and these particles tend to be much larger in size. For example, the metallic particles can be from about two to about four orders of magnitude larger than the impurity particles. Based on the similarities of the published specific gravities for the various metals and metal oxide compounds, it is surprising and unexpected that satisfactory separation is achieved employing gravity separation equipment.

A preferred example of gravity separation equipment is a diagonal riffle finishing shaking table. The table is rectangular in shape and includes a plurality of spaced longitudinal riffles. In such a device, classification is effected by the action imparted on the particles by a shaking motion in a direction roughly parallel to the longitudinal axis of the riffles. The table is tilted and flue dust is introduced at the upper end. A stream of liquid, preferably water, flowing in a direction transverse to the longitudinal axis of the riffles carries lighter particles over the riffles and down the slope of the table. The heavier metal particles move along the riffles toward the end of the table where they are collected. Thus, the lightest particles are collected at the bottom of the table, the heaviest particles are collected from the ends of the upper riffles, and middling particles are collected from the ends of intermediate riffles. The resulting material thus obtained at the upper ends of the table is a concentrate of copper, gold and silver but contains very minimal amounts of impurities.

Suitable diagonal riffle finishing shaking tables are available from Deister Company of Fort Wayne, Indiana. Alternative examples of preferred gravity separation equipment include spiral concentrators and centrifugal bowl concentrators. Hydrocyclones, jigs and Reichert cones may also be employed.

From the gravity separation equipment 22, the heavy fraction 24 composed of copper, gold and silver flows into a decanting bin 26 while the lighter fraction 28, containing most of the impurities, flows into a sump 30. Optionally, the lighter fraction 28 can be subjected to acidification 32 in order to leach copper values therefrom. Preferably, the slurry 28 is acidified to less than about pH 1. Whether or not the lighter fraction slurry 28 is acidified, it is next sent into a thickener 34.

In the decanting bin 26, the heavy dust concentrate fraction 24 settles at the bottom and a liquid portion 36 drains off through weep holes in the bin 26. The dewatered concentrate product 38 is recovered 40. The recovered concentrate 40 is recycled to the copper smelter. The drained off liquid portion 36 flows by gravity to a settling pond 42. The liquid overflow 44 from the settling pond is subjected to further copper recovery and eventual recycling as process water.

In the thickener 34, a sludge 46 formed by the settling of the solids is discharged at the bottom and pumped to a neutralization tank 48 where it is neutralized with lime milk 50. The neutralized slurry 52 is then dewatered in a drum filter 54 to form a waste cake product 56 and a filtrate 57. The filtrate 57 is sent to settling pond 42. Meanwhile, the solution 58 that overflows from the thickener 34 also is sent to the settling pond 42.

To increase process recovery of solubilized copper, the overflow solution 44 from the settling pond 42 is first subjected to pH adjustment, preferably to a pH of about 3, if necessary, and then passed through a sand filter 60 to remove suspended slimes that hinder the downstream recovery of copper by cementation 62. "Cementation" is an electrochemical precipitation of a metal, usually from an aqueous solution of its salt, by a more electropositive metal which, in this case, is preferably iron 64. Cementation 62 is carried out in a series of cascading cement launders 62 where iron scrap 64 is immersed in the continuously flowing copper-laden solution 66. The cement copper 68 is gathered regularly by scrapping it off of the iron scrap 64. The processed solution 70 from the cementation process 62 flows by gravity to a second settling pond 72. The overflow 74 from the settling pond 72 can be recycled as process water, for example as dilution water 16 to slurry the flue dust 10 in the slurry tank 18 or as wash spray 76 for the gravity separation equipment 22. The recovered copper from the cementation process 62 typically accounts for 5 to 10 percent of the copper recovery in addition to that recovered from the dust concentrate 40, which is recycled to the smelting, converting and refining process.

The following examples illustrate the present process in greater detail:

EXAMPLE 1

Converter Furnace Electrostatic Precipitator (CFEP) dust was fed to a slurry tank at a rate of 750 kgs/hr and mixed with sufficient water to produce a 20 weight percent solids slurry. The slurry was subjected to gravity separation on a diagonal riffle finishing shaking table. The product stream was divided into a heavy concentrate fraction and a tailing fraction. Regular sampling of the feed and product streams was carried out to monitor the composition of both feed and products.

The data obtained regarding the composition of the feed and product streams are shown in Table 1.

does not appreciably degrade the quality of anode copper.

The analysis of the concentrates produced as shown in Table 1 indicates that there is significant improvement qualitatively as compared to raw unprocessed dust. For the more problematic elements Sb, Bi and particularly As, rejection from the concentrate is well above 90 percent.

EXAMPLE 2

A second test was conducted to assess the effectiveness of gravity separation in removing impurities from an 11.35 kg copper-containing flue dust sample. The sample was obtained from flue dust that had been stock-

TABLE 1

| | Cu. % | Au, ppm | Ag, ppm | Sb, % | Bi, % | As, % | Fe, % | Pb, % | Zn, % | Cd, % | Te, % | Se, % |
|---|---|---|---|---|---|---|---|---|---|---|---|---|
| CF EP DUST FEED | | | | | | | | | | | | |
| WEIGHTED AVERAGE | 17.53 | 8.41 | 130.40 | 0.824 | 1.384 | 4.780 | 5.299 | 16.970 | 4.716 | 0.367 | 0.093 | 0.043 |
| ARITHMETIC MEAN | 18.24 | 8.62 | 132.62 | 0.790 | 1.395 | 4.430 | 5.757 | 14.326 | 4.389 | 0.332 | 0.095 | 0.041 |
| 95% CONFIDENCE INTERVAL | 1.80 | 1.20 | 19.60 | 0.200 | 0.300 | 1.200 | 1.000 | 4.000 | 1.114 | 0.077 | 0.017 | 0.013 |
| 95% CONFIDENCE RANGE | | | | | | | | | | | | |
| LOW | 16.70 | 7.40 | 113.10 | 0.590 | 1.095 | 3.230 | 4.757 | 10.326 | 3.275 | 0.255 | 0.078 | 0.028 |
| HIGH | 19.80 | 9.80 | 152.20 | 0.990 | 1.695 | 5.630 | 6.757 | 18.326 | 5.503 | 0.409 | 0.112 | 0.054 |
| HEAVY CONCENTRATE | | | | | | | | | | | | |
| WEIGHTED AVERAGE | 42.97 | 21.72 | 132.20 | 0.185 | 0.294 | 0.737 | 11.260 | 3.291 | 0.416 | 0.041 | 0.039 | 0.055 |
| ARITHMETIC MEAN | 43.17 | 21.45 | 132.35 | 0.214 | 0.315 | 0.782 | 11.191 | 3.177 | 0.420 | 0.043 | 0.039 | 0.052 |
| 95% CONFIDENCE INTERVAL | 5.70 | 2.90 | 21.70 | 0.063 | 0.113 | 0.402 | 1.064 | 1.288 | 0.109 | 0.018 | 0.006 | 0.011 |
| 95% CONFIDENCE RANGE | | | | | | | | | | | | |
| LOW | 37.50 | 18.55 | 110.70 | 0.151 | 0.202 | 0.380 | 10.127 | 1.889 | 0.311 | 0.025 | 0.033 | 0.041 |
| HIGH | 48.90 | 24.35 | 154.00 | 0.277 | 0.428 | 1.184 | 12.255 | 4.465 | 0.529 | 0.061 | 0.045 | 0.063 |
| TAILING | | | | | | | | | | | | |
| WEIGHTED AVERAGE | 7.57 | 3.60 | 133.40 | 1.086 | 1.837 | 6.453 | 3.817 | 22.658 | 6.484 | 0.501 | 0.117 | 0.040 |
| ARITHMETIC MEAN | 7.74 | 3.77 | 140.41 | 1.064 | 2.494 | 4.982 | 4.170 | 23.343 | 2.444 | 0.234 | 0.105 | 0.049 |
| 95% CONFIDENCE INTERVAL | 1.90 | 1.80 | 26.40 | 0.265 | 0.483 | 0.968 | 1.068 | 4.707 | 1.106 | 0.064 | 0.028 | 0.019 |
| 95% CONFIDENCE RANGE | | | | | | | | | | | | |
| LOW | 5.90 | 2.00 | 114.00 | 0.799 | 2.011 | 4.014 | 3.642 | 18.636 | 1.338 | 0.170 | 0.077 | 0.030 |
| HIGH | 9.60 | 5.50 | 166.90 | 1.329 | 2.977 | 5.950 | 5.778 | 28.050 | 3.550 | 0.298 | 0.133 | 0.068 |
| ACTUAL RECOVERIES | | | | | | | | | | | | |
| WEIGHTED AVERAGE | 66.10 | 69.60 | 27.40 | 6.40 | 5.70 | 4.20 | 57.30 | 5.20 | 2.40 | 3.00 | 11.10 | 34.30 |
| ARITHMETIC MEAN | 67.60 | 73.80 | 28.70 | 8.30 | 7.60 | 5.30 | 58.30 | 6.60 | 4.50 | 3.50 | 12.60 | 39.10 |
| 95% CONFIDENCE INTERVAL | 5.10 | 4.10 | 2.30 | 1.80 | 3.10 | 2.50 | 6.60 | 1.80 | 3.50 | 0.90 | 2.50 | 5.30 |
| 95% CONFIDENCE RANGE | | | | | | | | | | | | |
| LOW | 62.50 | 69.70 | 26.40 | 6.50 | 4.50 | 2.80 | 51.70 | 4.80 | 1.00 | 2.60 | 10.10 | 33.80 |
| HIGH | 72.70 | 77.90 | 31.00 | 10.10 | 10.70 | 7.80 | 64.90 | 8.40 | 8.00 | 4.40 | 15.10 | 44.40 |
| ACTUAL REJECTION | | | | | | | | | | | | |
| WEIGHTED AVERAGE | 33.90 | 30.40 | 72.60 | 93.60 | 94.30 | 95.80 | 42.70 | 94.80 | 97.60 | 97.00 | 88.90 | 65.70 |
| ARITHMETIC MEAN | 32.40 | 26.20 | 71.30 | 91.70 | 92.40 | 94.70 | 41.70 | 93.40 | 95.50 | 96.50 | 87.40 | 60.90 |
| 95% CONFIDENCE INTERVAL | 5.10 | 4.10 | 2.30 | 1.80 | 3.10 | 2.50 | 6.60 | 1.80 | 3.50 | 0.90 | 2.50 | 5.30 |
| 95% CONFIDENCE RANGE | | | | | | | | | | | | |
| LOW | 27.30 | 22.10 | 69.00 | 89.90 | 89.30 | 92.20 | 35.10 | 91.60 | 92.00 | 95.60 | 84.90 | 55.60 |
| HIGH | 37.50 | 30.30 | 73.60 | 93.50 | 95.50 | 97.20 | 48.30 | 95.20 | 99.00 | 97.40 | 89.90 | 66.20 |

As shown in Table 1, rejection rates for the listed impurities are very high, with the exception of iron, and copper and gold recoveries are at acceptable levels. Iron is not considered to be a problematic impurity as it piled for over 5 years. The sample was slurried at 50 weight percent solids and was ground 5 minutes in a rod mill to a nominal 28 mesh size. The slurry was then processed on a Deister shaking table. Concentrate, middling and tailing products were collected and the water decanted, saved and analyzed. The products were dried and analyzed, with the results shown in Table 2. As is apparent from Table 2, about 27 percent of the copper was recovered in the combined concentrate and middling fractions with a calculated copper grade of 72.8 percent. It was calculated that the solution which was decanted from the slurries contained about 12.7 weight percent of the original copper from the flue dust.

TABLE 2

| Product | Wt g | Assay, Wt. % | | | Distribution, Wt. % | | |
|---|---|---|---|---|---|---|---|
| | | Cu | Pb | As | Weight | Cu | Pb |
| Dust Feed (calc'd) | 11350 | 18.7 | 12.7 | — | 100.0 | 100.0 | 100.0 |
| Concentrate | 603 | 75.6 | 2.01 | | 5.3 | 21.5 | 0.8 |
| Middling | 184 | 63.6 | 5.48 | | 1.6 | 5.5 | 0.7 |
| Tailing | 6510 | 19.6 | 21.8 | 7.30 | 57.4 | 60.2 | 98.5 |

EXAMPLE 3

Two sulfuric acid leach tests were performed on the tailing fraction from the gravity separation test of Example 2. A 100-gram sample of the dried tailing fraction was used in each test. The sample was slurried to 20 weight percent solids with water and heated to 85° C. The slurry was agitated under normal atmospheric conditions for one hour, during which time sulfuric acid was added to maintain the target pH. The first test, with a terminal pH of 0.95 extracted 81.7 percent of the copper remaining in the tailing fraction for a total cumulative (including gravity separation recovery) copper recovery/extraction of 89 percent. The second test, with a terminal pH of 0.45, extracted 85.2 percent of the copper in the tailing fraction for a cumulative copper recovery/extraction of 91.1 percent. A significant amount of arsenic was also leached in these tests, with 76.3 percent and 91.3 percent being extracted at pH 0.95 and pH 0.45 respectively.

The results of Example 3 are summarized in Tables 3 through 6. Table 3 summarizes the conditions for the two tests. Table 4 summarizes the results of the two sulfuric acid leaching tests. Table 5 lists additional assays for test number 2. Table 6 illustrates the combined recoveries from the gravity separation of Example 2 and the acid leaching of Example 3.

TABLE 3

$H_2SO_4$ Leaching of Gravity Separation Tailing:

| Conditions: | 1 | 2 |
|---|---|---|
| Tailing Weight, g | 100 | 100 |
| Slurry $H_2O$, mls | 400 | 400 |
| Initial % Solids | 20 | 20 |
| Target Leach pH | 1.2 | 0.5 |
| $H_2SO_4$ Req'd, lb/ton | 724 | 996 |
| Temperature, C. | 85 | 85 |
| Time, hours | 1 | 1 |
| Filtrate pH (cool) | 0.95 | 0.45 |

TABLE 4

| Product | Wt g | Assay, wt. % | | | Distribution, % | | |
|---|---|---|---|---|---|---|---|
| | | Cu | Pb | As | Weight | Cu | Pb | As |
| Test 1 (pH 1.2 Leach): | | | | | | | | |
| Gravity Tailing | 100 | 19.6 | 21.8 | 7.30 | 100.0 | 100.0 | 100.0 | 100.0 |
| Residue | 52.4 | 6.83 | — | 3.30 | 52.4 | 18.3 | — | 23.7 |
| Filtrate | | — | — | — | 47.6 | 81.7 | — | 76.3 |
| Test 2 (pH 0.5 Leach): | | | | | | | | |
| Gravity Tailing | 100 | 19.6 | 21.8 | 7.30 | 100.0 | 100.0 | 100.0 | 100.0 |
| Residue | 48.1 | 6.03 | 43.8 | 1.32 | 48.1 | 14.8 | 96.6 | 8.7 |
| Filtrate | | — | — | — | 51.9 | 85.2 | 3.4 | 91.3 |

TABLE 5

Additional Residue Assays for Test No. 2:

| Ag, o/t: | 12.9 |
|---|---|
| Au, o/t: | 0.238 |
| Fe, %: | 6.36 |
| Bi, %: | 2.78 |
| Sn, %: | 1.59 |
| $SO_4$, %: | 19.7 |

TABLE 6

| Gravity and Leach | Solids Weight | | Recovery, % | | | |
|---|---|---|---|---|---|---|
| | | | Cu | | As | |
| | Int. | Cum. | Int. | Cum. | Int. | Cum. |
| Gravity Concentrate and Middling | 6.9 | 6.9 | 27 | 27 | — | — |
| $H_2O$ Solubles (From Gravity Separation) | 36 | — | 13 | 40 | — | — |
| $H_2SO_4$ Leach of Gravity Tailings: | | | | | | |
| 1. pH 1.2 Leach | 52 | 37 | 82 | 89 | 76 | — |
| 2. pH 0.5 Leach | 48 | 35 | 85 | 91 | 91 | — |
| Remaining Solids after Leach: | | | | | | |
| 1. pH 1.2 Leach | | 37 | | 11 | | (24)* |
| 2. pH 0.5 Leach | | 35 | | 9 | | (9)* |

Int. = Interval
Cum. = cumulative
*Assumes that no arsenic reported in either the gravity concentrates or the gravity separation solutions.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A process for treating a copper-containing flue dust in order to remove a substantial portion of impurities, said impurities comprising compounds containing elements selected from the group consisting of arsenic, bismuth, antimony, cadmium, lead, zinc, tellurium and selenium, from said flue dust, said process comprising:
    (a) mixing said flue dust with water to form a slurry,
    (b) subjecting said slurry to gravity separation wherein a portion of said copper remains in a heavy concentrate fraction and a substantial portion of the impurities comprising compounds containing elements selected from the group consisting of arsenic, bismuth, antimony, cadmium, lead, zinc, tellurium and selenium are separated into a light tailing fraction.

2. The process according to claim 1 wherein said gravity separation is accomplished by employing gravity separation equipment selected from the group consisting of shaking tables, spiral concentrators, centrifugal bowl concentrators, hydrocyclones, jigs and Reichert cones.

3. The process according to claim 1 wherein said gravity separation is accomplished by employing gravity separation equipment selected from the group consisting of shaking tables, spiral concentrators and centrifugal bowl concentrators.

4. The process according to claim 1 wherein said gravity separation is accomplished by employing a diagonal riffle finishing shaking table.

5. The process according to claim 1 wherein said slurry comprises from about 10 to about 30 weight percent flue dust solids.

6. The process according to claim 1 wherein the heavy concentrate and the light tailing slurries are subjected to separate liquid/solid separation steps and the liquid obtained therefrom is subjected to further copper recovery steps.

7. The process according to claim 6 wherein said further copper recovery steps include copper cementation.

8. The process according to claim 1 wherein the light tailing fraction is subjected to acid leaching in order to further recover copper.

9. A process for removing impurities, said impurities comprising compounds containing elements selected from the group consisting of arsenic, bismuth, antimony, cadmium, lead, zinc, tellurium and selenium, from copper-containing flue dust, said process comprising:
    (a) adding water to said flue dust in order to produce a slurry comprising from about 10 to about 30 weight percent flue dust solids,
    (b) subjecting said slurry to gravity separation in order to obtain a heavy concentrate fraction containing at least 35 weight percent copper and a light tailing fraction containing the majority of impurity compounds, said impurity compounds comprising compounds containing elements selected from the group consisting of arsenic, bismuth, antimony, cadmium, lead, zinc, tellurium and selenium,
    (c) subjecting said heavy concentrate fraction to solid/liquid separation,
    (d) recycling the solids portion of said heavy concentrate fraction to a copper smelting and converting process,
    (e) subjecting said light tailing fraction to a solid/liquid separation step,
    (f) recovering copper from the liquid overflow from the solid/liquid separation performed on said heavy concentrate fraction and the liquid overflow from solid/liquid separation performed on said light tailing fraction.

10. The process according to claim 9 wherein said liquid overflows are subjected to copper cementation in order to recover copper therefrom.

11. The process according to claim 9 wherein said light tailing fraction is subjected to acid leaching in order to further recover copper 12. The process according to claim 8 wherein the light tailing fraction is subjected to acid leaching with sulfuric acid in order to further recover copper.

13. The process according to claim 12 wherein the pH of the light tailing fraction is reduced to less than about pH 1.

14. The process according to claim 9 wherein the light tailing fraction is subjected to acid leaching in order to further recover copper therefrom and wherein the acidified leachate is further subjected to pH adjustment to about pH 3 prior to copper cementation to recover the solubilized copper.

* * * * *